(12) United States Patent
Saikawa (10) Patent No.: US 8,002,189 B2
(45) Date of Patent: Aug. 23, 2011

(54) MEDIA PROCESSING DEVICE, MEDIA PROCESSING SYSTEM, AND CONTROL METHOD FOR A MEDIA PROCESSING SYSTEM

(75) Inventor: Takashi Saikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 12/220,579

(22) Filed: Jul. 25, 2008

(65) Prior Publication Data
US 2009/0026268 A1 Jan. 29, 2009

(30) Foreign Application Priority Data
Jul. 25, 2007 (JP) ................... 2007-193749

(51) Int. Cl.
*G06K 13/04* (2006.01)
(52) U.S. Cl. ....................... 235/479; 235/375
(58) Field of Classification Search .................. 235/479, 235/449, 375, 493; 705/45
See application file for complete search history.

(56) References Cited

U.S. PATENT DOCUMENTS

| | | | |
|---|---|---|---|
| 6,832,723 B2 | 12/2004 | Murata et al. | |
| 6,983,885 B2 | 1/2006 | Endo et al. | |
| 7,010,155 B2 | 3/2006 | Koakutsu et al. | |
| 7,190,821 B2 | 3/2007 | Koakutsu et al. | |
| 7,341,178 B2 | 3/2008 | Fujikawa | |
| 2004/0217170 A1* | 11/2004 | Takiguchi et al. | 235/449 |
| 2005/0252960 A1* | 11/2005 | Murata | 235/379 |
| 2006/0043182 A1* | 3/2006 | Kinoshita | 235/449 |

FOREIGN PATENT DOCUMENTS

| | | |
|---|---|---|
| JP | 2003-8803 | 1/2003 |
| JP | 2003-123117 | 4/2003 |
| JP | 2005-149013 | 6/2005 |
| JP | 2007-148717 | 6/2007 |

\* cited by examiner

*Primary Examiner* — Edyn Labaze
(74) *Attorney, Agent, or Firm* — Nutter McClennen & Fish LLP; John J. Penny, Jr.; Christina M. Sperry (57) ABSTRACT

A hybrid processing device that continuously reads information from a plurality of process media can set the speed of the continuous reading process appropriately to the situation. The hybrid processing device 20 has a conveyance portion 2c, a reading control unit 28, and a discharge control unit 25 that runs a discharge process according to the result of the read process, and continuously reads a plurality of checks S according to instructions from a host computer 30. The reading control unit 28 runs a read process to read all read items when the reading accuracy priority mode is selected. When the reading speed priority mode is selected, the reading control unit 28 runs a read process to read only specific read items. In the reading accuracy priority mode the discharge control unit 25 runs the discharge process based on the results of reading all read items, and in the reading speed priority mode runs the discharge process controls the discharge process based on the results of reading only the specified read items.

12 Claims, 8 Drawing Sheets

MEDIA PROCESSING DEVICE, MEDIA PROCESSING SYSTEM, AND CONTROL METHOD FOR A MEDIA PROCESSING SYSTEM

BACKGROUND OF THE INVENTION

1. Field of Invention

The present invention relates to a media processing device, to a media processing system, and to a control method for a media processing system.

2. Description of Related Art

Technologies for electromagnetically reading checks have been developed in order to improve the efficiency of check processing. Devices enabling electromagnetically reading checks at the teller window in banks, for example, have also been introduced, and check processing devices (hybrid processing devices) that are compact enough to enable installation at the teller window are known from the literature.

Processing devices of this type generally have a magnetic ink character reader and an image scanner disposed along the check transportation path. When a bank teller receives a check from a customer and passes the check through the processing device, the processing device typically reads the magnetic ink characters that are printed on the check, captures an image of the check, and may even print an endorsement on the check. The captured MICR data and image data is then sent to a host computer. The host computer determines if the received magnetic ink character recognition (MICR) data and image data was read correctly, and based on the result of this decision sends a command controlling the next process to the check processing device. See, for example, Japanese Unexamined Patent Appl. Pub. JP-A-2005-149013. The decision includes the result of the MICR process, the result of an optical character recognition (OCR) process, and whether the captured image data is acceptable.

For example, based on the result of this decision, the checks can be directed to a particular exit if the check processing device has a plurality of media discharge bins (exits). If the check was read correctly, VOID, PROCESSED, or similar content is printed or stamped on the face of the check to indicate that the check has been read and processed electronically.

The check processing device thus simply executes a data reading process and sends the read information to the host computer in response to a read command sent from the host computer. More basically, the check processing device only executes processes in response to commands from the host computer, and leaves verification processes and other operations that require more processor power to the host computer.

It is also possible, however, for the check processing device to run only verification processes that do not require significant processor power and execute processes determined by the reading result. For example, the check processing device could detect multifeed situations in which two or more checks are conveyed together in the read process, detect insertion errors if a check is loaded the wrong way, or detect errors caused by ambient noise around the check processing device, and execute a corresponding process.

There are thus numerous factors that are evaluated and determined based on the read results when the items evaluated by the host computer and the items evaluated by the check processing device are combined. The reliability and accuracy of the reading process thus improves as the number of evaluation items increases. The throughput of the check processing device drops as the number of evaluation items increases, however, because more processing time is required. There is thus a trade-off between reading speed and accuracy.

Check processing devices enabling continuously reading a plurality of checks in response to a continuous read command sent from the host computer are also known from the literature. The ability to change the processing operation according to the result of reading individual checks is also desirable even when continuously processing a batch of checks.

When the operator tells the check processing device to execute a continuous reading process, there is generally a greater need for processing speed than reading accuracy. In practice, however, it is generally desirable to ensure reading with high accuracy even if this means a slight drop in speed. A check processing device that can execute a continuous check reading process appropriate to the situation is therefore needed.

SUMMARY OF THE INVENTION

A media processing device according to the present invention enables continuously reading information from a plurality of process media while setting the continuous reading speed appropriately to the situation.

A first aspect of the invention is a media processing device for continuously reading a plurality of media based on a command from a host computer, including: a transportation path through which media are conveyed; a reading control unit that reads information from the media in the transportation path to extract a plurality of evaluation items; and a discharge process unit that executes a discharge process based on the read result. The reading control unit executes a read process for all evaluation items when a reading accuracy priority mode that prioritizes reading accuracy is set, and executes a read process for specific evaluation items when a reading speed priority mode that prioritizes reading speed is set; and the discharge process unit runs the discharge process based on the read result for all evaluation items in the reading accuracy priority mode, and runs the discharge process based on the read result for the selected evaluation items in the reading speed priority mode.

Another aspect of the invention is a media processing system including a host computer and a media processing device for continuously reading a plurality of media based on a command from the host computer. The media processing device includes a transportation path through which media are conveyed, a reading control unit that reads information from the media in the transportation path to extract a plurality of evaluation items, and a discharge process unit that executes a discharge process based on the read result. The reading control unit executes a read process for all evaluation items when a reading accuracy priority mode that prioritizes reading accuracy is set, and executes a read process for specific evaluation items when a reading speed priority mode that prioritizes reading speed is set; and the discharge process unit runs the discharge process based on the read result for all evaluation items in the reading accuracy priority mode, and runs the discharge process based on the read result for the selected evaluation items in the reading speed priority mode.

Another aspect of the invention is a media processing device including a transportation path through which media are conveyed; a reading control unit that reads information from the media in the transportation path to extract a plurality of evaluation items; and a discharge process unit that executes a discharge process based on the read result. The reading control unit executes a read process for specific evaluation items when a reading speed priority mode that prioritizes reading speed is set, and executes a read process for more evaluation items than in the reading speed priority mode when a reading accuracy priority mode that prioritizes reading accuracy is set; and the discharge process unit runs the discharge process based on the read result for the items processed in the reading accuracy priority mode or the reading speed priority mode.

When executing the continuous reading process, the invention thus enables selecting a reading speed priority mode that prioritizes reading speed, or a reading accuracy priority mode that prioritizes reading accuracy. The reading speed priority mode enables faster processing because only specific information (evaluation items) is read. The reading accuracy priority mode enables reading with high accuracy because all read items are evaluated. The speed of the continuous reading process can thus be controlled appropriately according to the situation.

In a media processing device according to another aspect of the invention the reading accuracy priority mode includes a sequential processing mode in which conveying the next media starts after the previously conveyed media is discharged, and a parallel processing mode in which conveying the next media starts before the previously conveyed media is discharged.

In a media processing device according to another aspect of the invention when in the reading accuracy priority mode and the sequential processing mode is set, conveying the next media starts after the previously conveyed media is discharged, and when the parallel processing mode is set, conveying the next media starts before the previously conveyed media is discharged.

When the reading accuracy priority mode is set in this aspect of the invention, it is additionally possible to select whether operation proceeds in a parallel processing mode or a sequential processing mode. The speed of the continuous reading process can therefore be set appropriately to the situation. When in the sequential processing mode there is always only one processing medium in the transportation path. As a result, if the read process is interrupted for some reason, determining which processing medium caused the interruption can be easily determined.

In another aspect of the invention the specific evaluation items are items that the media processing device can read and evaluate alone, and the group of all evaluation items includes items for which reading is evaluated by the host computer.

Because the media processing device (hybrid processing device) alone can evaluate the reading results for the specific evaluation items, processing can proceed at high speed because the media processing device does not need to wait for the host computer to evaluate the read results.

In another aspect of the invention the reading control unit reads image data and magnetic ink character data from the media, and the discharge process unit executes a discharge process based on the image data and magnetic ink character data according to configuration instructions sent from the host computer that set the discharge path, set whether to repeat the continuous reading process, and set whether to apply an electronic processing mark indicating that the image data and magnetic ink character data were electronically processed.

This aspect of the invention enables diverting the discharge path, discharging the media without imparting the electronic processing mark, or interrupting the reading process if a reading error is detected.

Other objects and attainments together with a fuller understanding of the invention will become apparent and appreciated by referring to the following description and claims taken in conjunction with the accompanying drawings.

DESCRIPTION OF PREFERRED EMBODIMENTS

A preferred embodiment of the present invention is described below with reference to the accompanying figures.

Figure 1:
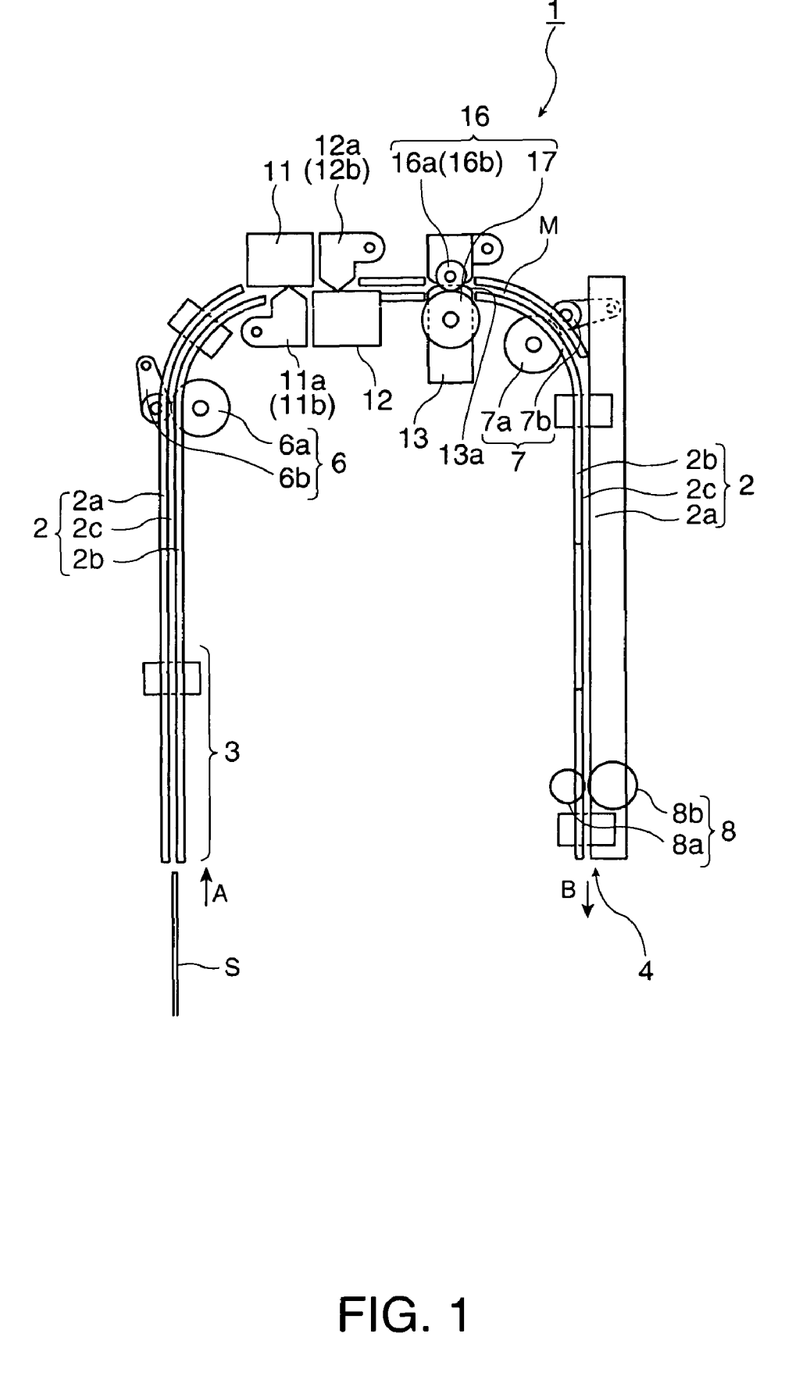
FIG. 1 is a schematic diagram of the paper transportation path in a hybrid processing device used in a hybrid processing system according to a preferred embodiment of the invention.

This embodiment of the invention describes a hybrid processing system including a host computer and a hybrid processing device that executes a read process according to a command from the host computer as an example of an information reading device according to a media processing device of the present invention. FIG. 1 is a schematic diagram of the paper transportation path in the hybrid processing device of the hybrid processing system according to this embodiment of the invention.

Mechanical Configuration of the Hybrid Processing Device

While conveying sheet media (conveyed media) such as checks that are loaded into an automatic sheet feeder (ASF) 3 as the paper supply unit through a paper transportation path 2, the hybrid processing device 1 according to the embodiment of the invention shown in FIG. 1 images both sides of the sheet media and reads the magnetic ink characters on the sheet media.

The check S transportation path 2 is substantially U-shaped, and has a middle transportation path M in the portion corresponding to the bottom of the U. Various reading devices are disposed to this middle transportation path M. The paper transportation path 2 includes a conveyance portion 2c between an outside guide 2a and an inside guide 2b, and the check S are conveyed along this conveyance portion 2c.

An automatic sheet feeder 3 that holds multiple checks S is disposed to the upstream end of the paper transportation path 2. The plural checks S are inserted in the direction of arrow A by the automatic sheet feeder 3 to the paper transportation path 2. The plural checks S loaded in the automatic sheet feeder 3 are separated and fed one at a time into the paper transportation path 2.

Disposed as a transportation means for conveying the checks S through the paper transportation path 2 are a first paper transportation roller pair 6 on the upstream side of the middle transportation path M, a middle transportation roller set 16 disposed to the middle transportation path M, a second transportation roller pair 7 on the downstream side of the middle transportation path M, and a discharge roller pair 8 located before the exit 4.

The paper transportation roller pair 6 includes a drive roller 6a and a pressure roller 6b located on the other side of the paper transportation path 2 opposite the drive roller 6a.

The second transportation roller pair 7 includes a drive roller 7a and a pressure roller 7b located on the other side of the paper transportation path 2 opposite the drive roller 7a.

The middle transportation roller set 16 includes a lower pressure roller 16a disposed to the lower part of the paper transportation path 2, an upper pressure roller 16b disposed above the lower pressure roller 16a, and a drive roller 17 located on the other side of the middle transportation path M opposite the lower pressure roller 16a and upper pressure roller 16b.

Checks S that are fed from the automatic sheet feeder 3 into the paper transportation path 2 are conveyed by the first paper transportation roller pair 6, the middle transportation roller set 16, and the second transportation roller pair 7 through the middle transportation path M, and are then discharged in the direction of arrow B by the discharge rollers 8.

A first image scanner 11 and a second image scanner 12 for imaging both sides of the processed media are disposed on opposite sides of the middle transportation path M at offset positions in the paper transportation direction. The first and second image scanners 11 and 12 are CIS (contact image sensor) type scanners. The image scanners 11 and 12 each emit light to one side of each check S conveyed through the middle transportation path M, sense the light reflected from the media using a plurality of photosensors (photoelectric conversion elements), convert the light to electric signals, and capture one line of the check image. In this embodiment of the invention the first image scanner 11 images the back of each check S and the second image scanner 12 images the front of each check S one line at a time to acquire a two-dimensional image of the check S.

The MICR (magnetic ink character recognition) reader 13 for reading the MICR line is located below the drive roller 17. The MICR reader 13 is a sensor for reading the magnetic ink characters printed on the front of the check S. The MICR reader 13 reads the magnetic ink characters with the check S pressed against the surface of the MICR reader 13 by means of a pressure lever disposed on the other side of the middle transportation path M opposite the MICR reader 13. The MICR reader 13 can thus read the MICR line containing the account number and other information specific to each check S that is printed using magnetic ink characters.

Figure 2:
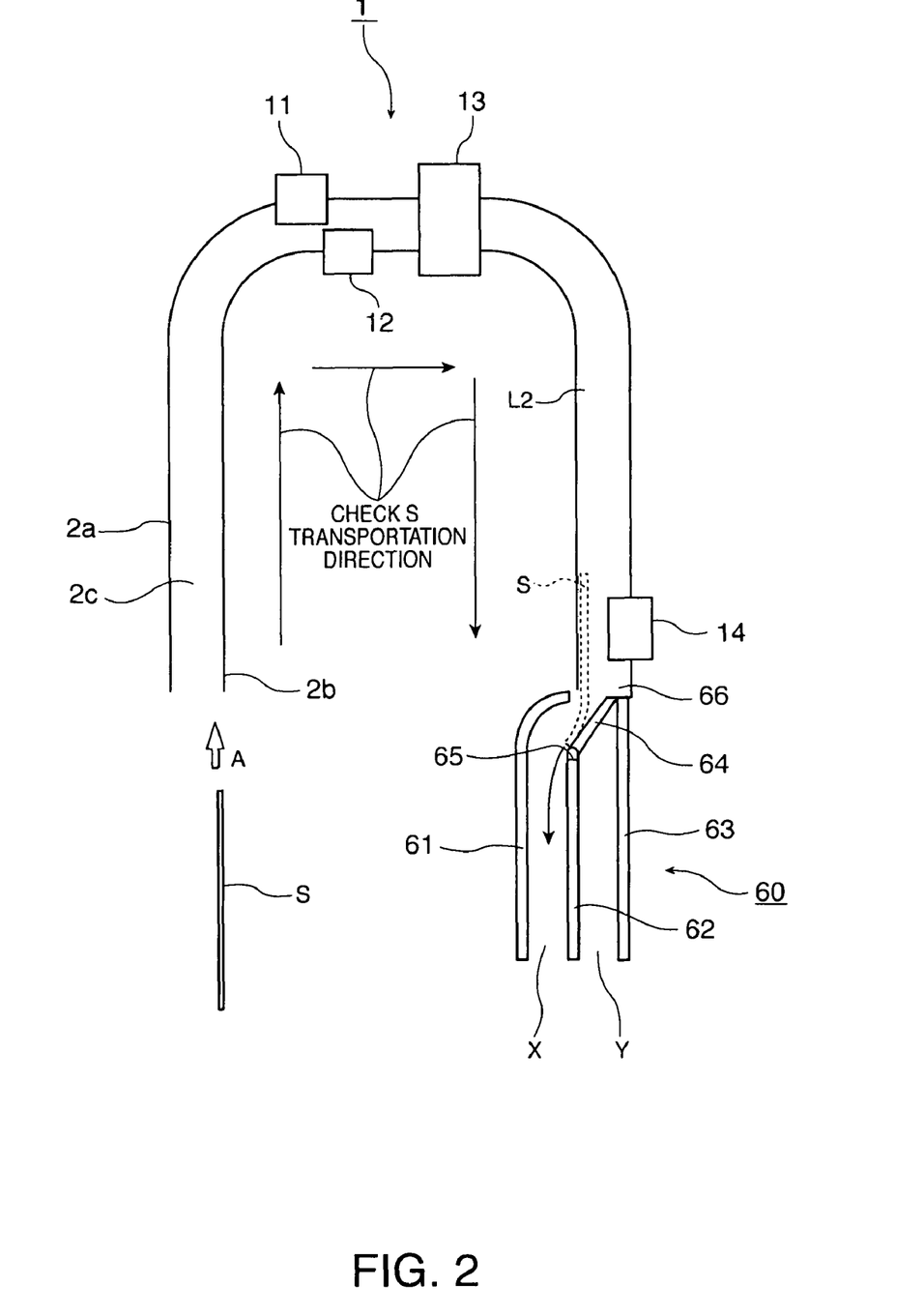
FIG. 2 is a schematic diagram showing the relative positions of the discharge tray that is connected to the transportation unit, the image scanners 11 and 12, the MICR reader 13, and the stamping mechanism 14.

The discharge unit connected to the conveyance portion 2c of the hybrid processing device 1 is described next with reference to FIG. 2. FIG. 2 shows the relative positions of the discharge tray connected to the conveyance portion 2c, the image scanners 11 and 12, the MICR reader 13, and the stamping mechanism 14.

The discharge unit 60 is attached near the end part 66 of the conveyance portion 2c of the paper transportation path 2 in the hybrid processing device 1. The discharge unit 60 stores the checks S discharged thereto by the discharge roller unit (not shown in the figure) after the checks S have been read and scanned by the reading devices disposed to the conveyance portion 2c.

The discharge unit 60 has an inside guide plate 61, middle guide plate 62, and outside guide plate 63. The inside guide plate 61 and middle guide plate 62 render a first discharge path X, and the middle guide plate 62 and outside guide plate 63 render a second discharge path Y. A flapper 64 that can pivot is disposed to the paper transportation roller pair 6 at the end part 66 of the conveyance portion 2c, and can be operated to open or close the entrances to the first discharge path X and second discharge path Y. The distal end part of the flapper 64 extends substantially to the end part 66 of the transportation path.

The position of the flapper 64 in this embodiment of the invention changes according to the result of the reading processes executed by the various reading devices, and functions to switch the discharge path that communicates with the conveyance portion 2c.

The stamping mechanism 14 is disposed to the end part 66 of the transportation path, and stamps the face of the checks S immediately before being discharged into the discharge unit 60. If the check S was correctly imaged and the MICR line was successfully read by the scanners and MICR reader, VOID or other information indicating that the check was successfully processed electronically is stamped on the check S.

Internal Processing by the Hybrid Media Processing System

Figure 3:
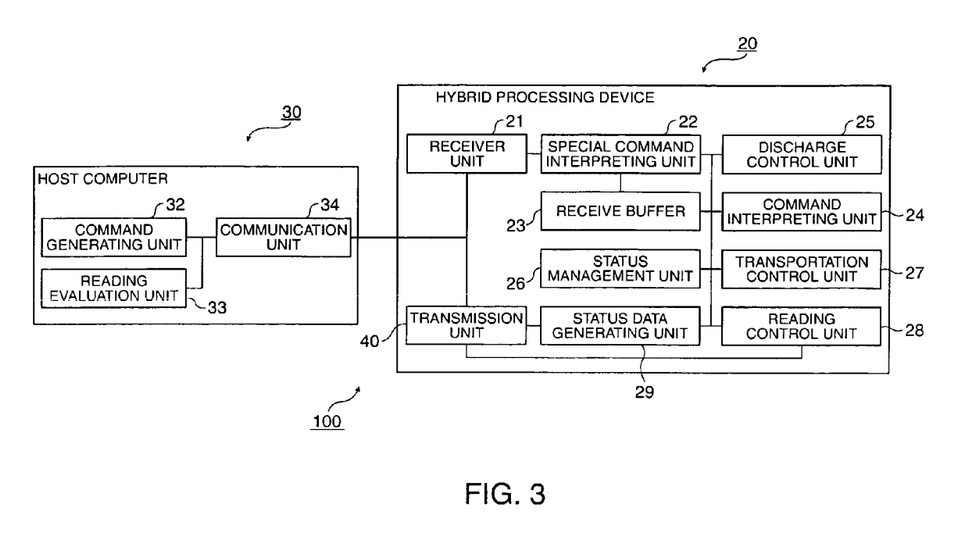
FIG. 3 is a function block diagram showing the internal processes of the hybrid processing system.

Internal processing by the hybrid processing system is described next with reference to FIG. 3. FIG. 3 is a function block diagram showing the internal processes of the hybrid processing system. This hybrid processing system 100 includes a host computer 30 and a hybrid processing device 20.

Internal Processes of the Host Computer

The host computer 30 includes a command generating unit 32, a reading evaluation unit 33, and a communication unit 34.

The command generating unit 32 generates commands for executing the operations of the hybrid processing device 20. One such command is a continuous read command for conveying a plurality of checks S loaded in the automatic sheet feeder 3 through the transportation path, imaging the checks S by means of the image scanners 11 and 12, and reading the magnetic ink characters by means of the MICR reader 13. The command generating unit 32 also generates operating condition configuration commands that set the discharge process in the continuous reading process according to the result of reading individual checks S.

The reading evaluation unit 33 recognizes the information read by the hybrid processing device 20. More specifically, the reading evaluation unit 33 determines the quality (CAR/LAR, IQA, other) of the image data captured by the image scanners 11 and 12, executes an optical character recognition (OCR) process, and executes the MICR process.

The communication unit 34 is an interface for communicating with the hybrid processing device 20. The communication unit 34 outputs commands generated by the command generating unit 32, and receives the read information sent from the hybrid processing device 20.

Internal Processes of the Hybrid Processing Device

The hybrid processing device 20 includes a receiver unit 21, a special command interpreting unit 22, a receive buffer 23, a command interpreting unit 24, a discharge control unit 25, a status management unit 26, a transportation control unit 27, a reading control unit 28, a status data generating unit 29, and a transmission unit 40.

The receiver unit 21 is an interface for receiving data sent from the host computer 30. If the data received by the receiver unit 21 is a special command, the command is interpreted by the special command interpreting unit 22, and if the received data is not a special command, the data is temporarily stored in the receive buffer 23. The command interpreting unit 24 sequentially reads and interprets the data stored in the receive buffer 23, and the status management unit 26 issues instructions to the control units according to the interpreted command.

If the command interpreting unit 24 determines that the received data is a continuous read command, the status management unit 26 issues instructions to the transportation control unit 27 and reading control unit 28 to apply the continuous reading process to the checks S. More specifically, commands for imaging the front and back of the checks S and reading the MICR line of each check are asserted.

Based on the operating condition configuration command sent from the host computer 30, the discharge control unit 25 sets the discharge process for each check S in the continuous reading process. This includes causing the flapper 64 to pivot and change direction according to the operating condition settings. This enables switching whether a check S is discharged into the first discharge path X or the second discharge path Y according to the results of reading the check.

The reading control unit 28 sends the information captured by the image scanners 11 and 12 and MICR reader 13 through the transmission unit 40 to the host computer 30.

The status management unit 26 controls the overall operation of the hybrid processing device 20. The status management unit 26 monitors the other units, and the status data generating unit 29 generates status data if there is a change in status. The status data includes, for example, a start feeding report indicating that the automatic sheet feeder 3 has started feeding checks S, a reading completed report indicating that the reading processes of the image scanners 11 and 12 and MICR reader 13 finished, and a discharge completed report indicating that the check S was discharged into the discharge unit 60. The output status reports are sent through the transmission unit 40 to the host computer 30.

If the received data includes special text strings, the special command interpreting unit 22 recognizes the data as a special command and interprets the special command.

Continuous Reading Process

The continuous reading process executed by the hybrid processing system 100 according to this embodiment of the invention is described next.

The hybrid processing device 20 can selectively switch between a reading accuracy priority mode in which reading accuracy has priority over the reading speed, and a reading speed priority mode in which reading speed has priority over reading accuracy.

When the reading accuracy priority mode is set, the reading control unit 28 applies the read process to all read items. When the reading speed priority mode is set, the read process is applied only to specific read items.

Specific examples of the read items include: A, detection of a multifeed state in which a plurality of checks S are conveyed together in the read process; B, detection of a check S orientation error; C, detection of abnormal ambient noise around the hybrid processing device 20; D, the result of the MICR process; E, the result of the OCR process; and F, the result of the image data evaluation.

More specifically, when the reading accuracy priority mode is set, the reading control unit 28 evaluates the result of the read process for all of the above items A to F. When the reading speed priority mode is set, the reading control unit 28 evaluates the result of the read process for at least one of the items A to F. In this embodiment of the invention the reading result is evaluated for items A to C when the reading speed priority mode is set.

Items A to C are items that can be evaluated by the hybrid processing device 20 alone, while items D to F are read items that require evaluation on the host computer 30 side. Because only items A to C are evaluated in the reading speed priority mode, the decision time can be shortened and high speed processing can be achieved. The reading accuracy priority mode, however, affords an accurate, reliable check reading process because all of the read items are evaluated.

The continuous read command in this embodiment of the invention is a command controlling the selection of the reading speed priority mode or reading accuracy priority mode, whether to read the MICR line on the checks S, and whether to image the checks S.

The operating condition configuration command includes first and second operating condition configuration commands. The first operating condition configuration command selects the read items that are read in the reading speed priority mode and the discharge process that is executed according to the result of reading each read item. The second operating condition configuration command sets the discharge process in the reading accuracy priority mode.

Based on read item A in the reading speed priority mode, the first operating condition configuration command selects the discharge destination when a multifeed state is detected, selects the VOID stamp impression process when multifeeding is detected, selects the VOID stamp impression process when the checks are fed normally, and selects whether to continue the continuous read process when multifeeding is detected.

Based on read item B, the first operating condition configuration command selects the discharge destination when a check insertion (loading) error is detected, selects the VOID stamp impression process when a check insertion error is detected, and selects whether to continue the continuous reading process when a check insertion error is detected.

Based on read item C, the first operating condition configuration command selects the discharge destination when a abnormal ambient noise is detected, selects the VOID stamp impression process when abnormal ambient noise is detected, and selects whether to continue the continuous reading process when abnormal ambient noise is detected.

The second operating condition configuration command selects the discharge destination, selects the VOID stamp impression process, and selects whether to run the continuous reading process in the reading accuracy priority mode.

The continuous reading process is described next in each operating mode.

Reading Speed Priority Mode

Figure 4:
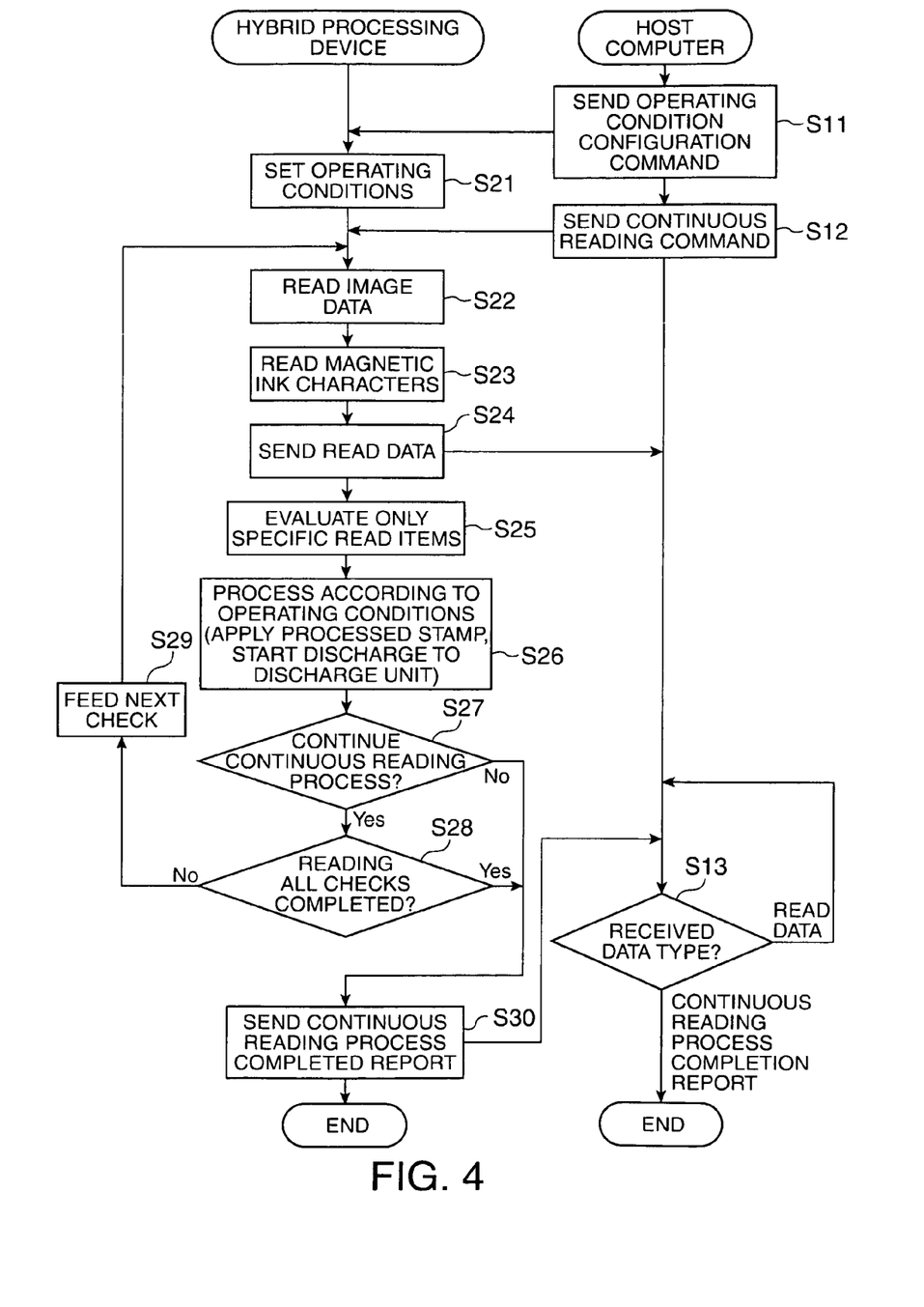
FIG. 4 is a flow chart describing the reading speed priority mode.
Figure 5:
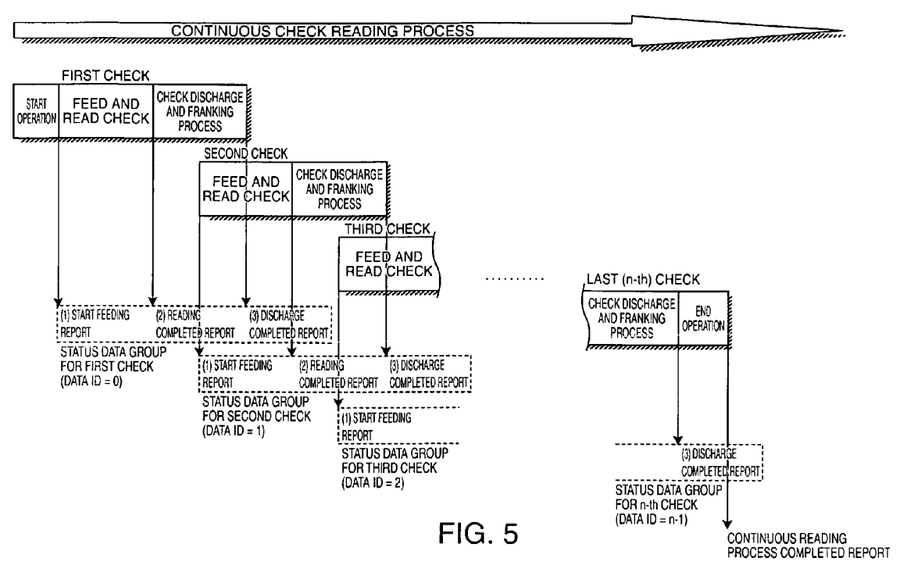
FIG. 5 is a timing chart describing the reading speed priority mode.

FIG. 4 is a flow chart describing the reading speed priority mode. 5 is a timing chart describing the reading speed priority mode.

In the reading speed priority mode as shown in FIG. 5, conveying the next check S can start before the previously fed check S is discharged into the discharge unit 60. The read items A to C are evaluated, and the discharge process is determined according to the read results.

If the operator selects the reading speed priority mode in the continuous reading process, the command generating unit 32 of the host computer 30 generates and sends an operating condition configuration command setting the operating conditions through the communication unit 34 to the hybrid processing device 20 (step S11). If the command interpreting unit 24 of the hybrid processing device 20 determines the data sent from the host computer 30 is the operating condition configuration command, the discharge control unit 25 sets the discharge process for each check S in the continuous reading process (step S21).

The command generating unit 32 of the host computer then generates and sends a continuous read command for the checks to the hybrid processing device 20 (step S12). When the hybrid processing device 20 receives the continuous read command, it advances the first check S and returns a start feeding status report. The check S is then imaged by the image scanners 11 and 12 (step S22) and the MICR line of the check S is read by the MICR reader 13 (step S23). The read information is then sent from the hybrid processing device 20 to the host computer 30 (step S24). When the read process ends, a reading completed status report is sent to the host computer 30.

The read results for read items A to C are then evaluated (step S25), and the discharge process is executed according to the evaluation result according to the operating conditions set in step S21 (step S26). More specifically, if the VOID stamp is to be applied, the stamp is pressed to the face of the check S and the check S is then discharged into the discharge unit 60. The check is discharged into the discharge path of the discharge unit 60 set by the operating condition configuration command. When discharging the first check S is completed, the hybrid processing device 20 sends a discharge completed status report to the host computer 30.

If the continuous reading process is set to continue (step S27 returns Yes), and the read process has not been completed for all checks S (step S28 returns No), the next check S is conveyed (step S29), and steps S22 to S28 repeat. When the read process has been completed for all checks S in step S28 (step S28 returns Yes), a continuous reading process completion report is sent to the host computer 30 and the continuous reading process ends (step S30).

If the continuous reading process is not set to repeat in step S27, the continuous reading process completion report is sent to the host computer 30 and the continuous reading process ends (step S30).

When the host computer 30 detects the continuous reading process completion report in the data sent from the hybrid processing device 20 (step S13), the host computer 30 ends the continuous reading process for the checks S.

Operation in the reading accuracy priority mode is described next.

Reading Accuracy Priority Mode

Figure 6:
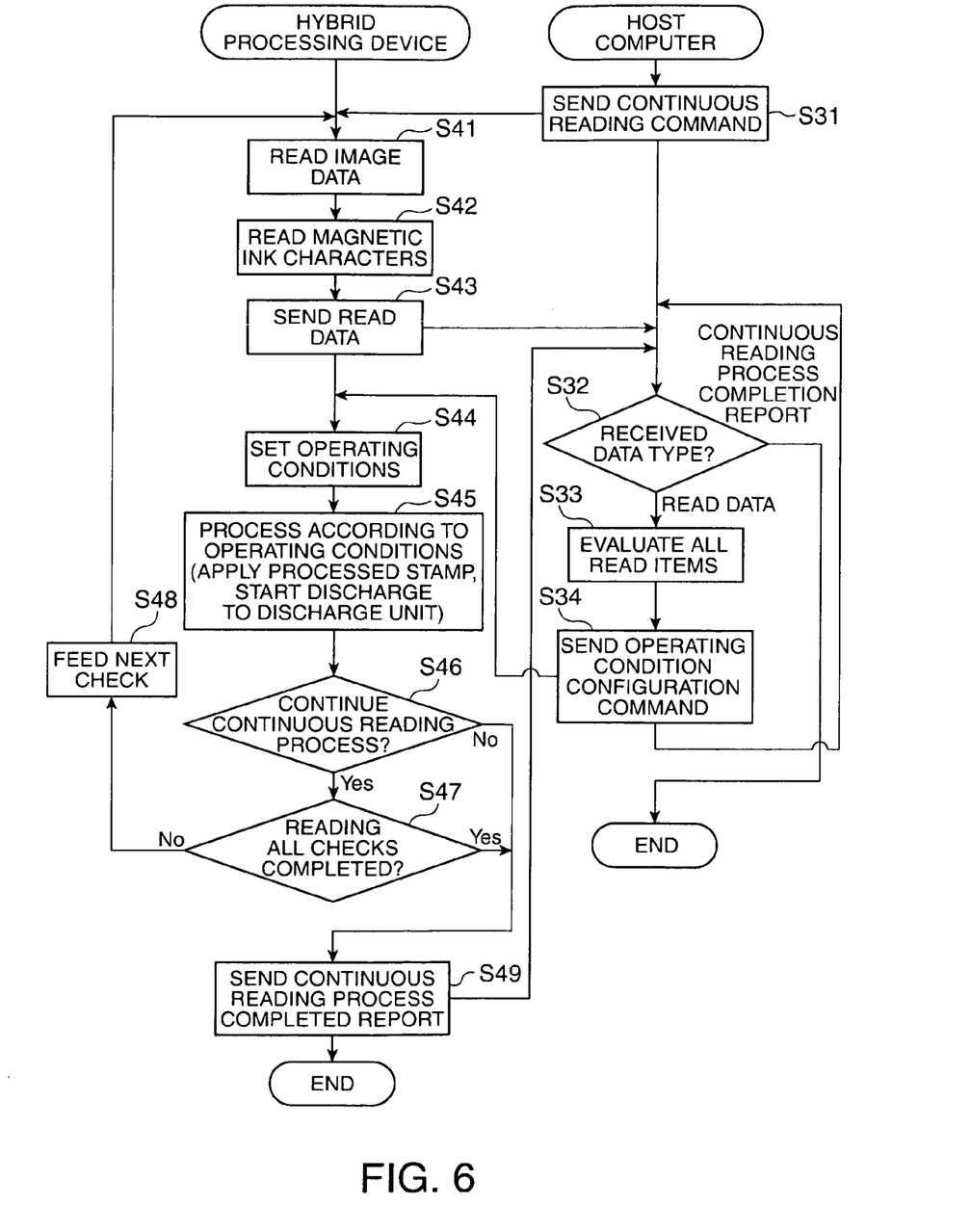
FIG. 6 is a flow chart describing the reading accuracy priority mode.
Figure 7:
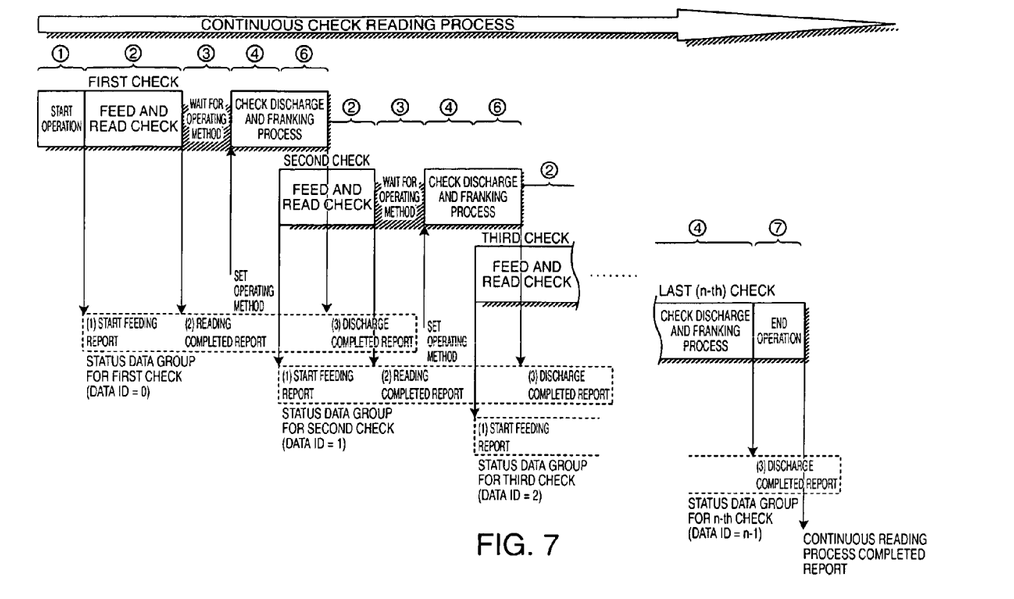
FIG. 7 is a timing chart describing the reading accuracy priority mode.

FIG. 6 is a flow chart describing the reading accuracy priority mode. 7 is a timing chart describing the reading accuracy priority mode.

In the reading accuracy priority mode as shown in FIG. 7, operation pauses before the discharge process starts after the check S read process ends, and the discharge process waits for the operating condition configuration command from the host computer 30. All of the read items A to F described above are evaluated, and the discharge process is controlled according to the read result.

If the operator selects the reading accuracy priority mode in the continuous reading process, the command generating unit 32 of the host computer 30 generates and sends an operating condition configuration command for the checks to the hybrid processing device 20 (step S31).

When the hybrid processing device 20 receives the continuous read command, it advances the first check S and returns a start feeding status report. The check S is then imaged by the image scanners 11 and 12 (step S41) and the MICR line of the check S is read by the MICR reader 13 (step S42). The read information is then sent from the hybrid processing device 20 to the host computer 30 (step S43). When the read process ends, a reading completed status report is sent to the host computer 30.

If the host computer 30 determines that the data sent from the hybrid processing device 20 is the data read from the check S (step S32), the host computer 30 evaluates the read items A to F (step S33). The host computer 30 then generates and sends an operating condition configuration command setting the operating conditions according to the result of evaluating the read data (step S33) through the communication unit 34 to the hybrid processing device 20 (step S34).

The hybrid processing device 20 pauses processing until the operating condition configuration command is received from the host computer 30. When the command interpreting unit 24 interprets the operating condition configuration command in data sent from the host computer 30, the discharge control unit 25 sets the operating conditions accordingly (step S44).

If the operating conditions set in step S44 are set to apply the VOID stamp, the stamp is pressed to the surface of the check S which is then discharged to the discharge unit 60. The check is discharged into the path of the discharge unit 60 that is set by the operating condition configuration command (step S45), and when discharging the first check S ends, the hybrid processing device 20 sends a discharge completed status report to the host computer 30.

If the continuous reading process is set to continue (step S46 returns Yes), and the read process has not been completed for all checks S (step S47 returns No), the next check S is conveyed (step S48), and steps S41 to S47 repeat.

When the read process has been completed for all checks S in step S47 (step S47 returns Yes), a continuous reading process completion report is sent to the host computer 30 and the continuous reading process ends (step S49).

If the set operating conditions are not configured to repeat the continuous reading process in step S46, the continuous reading process completion report is sent to the host computer 30 and the continuous reading process ends (step S49).

When the host computer 30 detects the continuous reading process completion report in the data sent from the hybrid processing device 20 (step S32), the host computer 30 ends the continuous reading process for the checks S.

The operating condition configuration command sent from the host computer 30 in step S33 includes a setting for selecting parallel processing or serial processing in the reading accuracy priority mode.

As shown in FIG. 7, when parallel processing is selected, conveying the second check S starts simultaneously to discharging the first check S. As a result, there are two checks S in the conveyance portion 2c after the read process for the first check.

Figure 8:
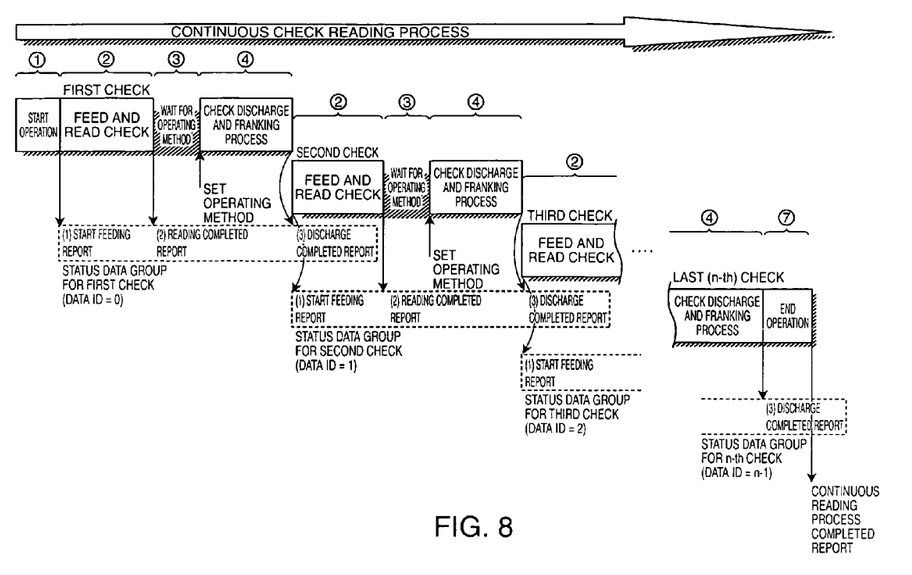
FIG. 8 is a timing chart describing sequential processing in the reading accuracy priority mode.

FIG. 8 is a timing chart describing operation in the reading accuracy priority mode when serial processing is selected.

As shown in FIG. 8, when serial processing is selected the second check S is conveyed after the first check S is completely discharged. As a result, there is only one check S in the conveyance portion 2c at any time. This enables easily identifying the check S that caused an interruption when the read process is interrupted for some reason.

This embodiment of the invention enables specifying by means of the continuous read command whether to apply the continuous reading process to the checks S in a reading speed priority mode that prioritizes processing speed, or a reading accuracy priority mode that prioritizes reading accuracy while accepting a slight drop in processing speed. When the reading accuracy priority mode is selected, the operating condition configuration command can also select parallel processing or serial processing. The speed of the continuous reading process can therefore be set appropriately according to the situation.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device for continuously reading a plurality of media based on a command from a host computer, comprising:
a transportation path through which media are conveyed;
a reading control unit that reads information from the media in the transportation path to extract a plurality of evaluation items; and
a discharge process unit that executes a discharge process based on a read result;
wherein the reading control unit executes a read process for all evaluation items when a reading accuracy priority mode that prioritizes reading accuracy is set, and executes a read process only for specific evaluation items of the all evaluation items when a reading speed priority mode that prioritizes reading speed is set; and
the discharge process unit runs the discharge process based on the read result for all evaluation items in the reading accuracy priority mode, and runs the discharge process based on the read result for the specific evaluation items in the reading speed priority mode.

2. The media processing device described in claim 1, wherein:
the reading accuracy priority mode includes
a sequential processing mode in which conveying the next media starts after the previously conveyed media is discharged, and
a parallel processing mode in which conveying the next media starts before the previously conveyed media is discharged.

3. The media processing device described in claim 1, wherein:
the specific evaluation items are items that the media processing device can read and evaluate alone, and
the group of all evaluation items includes items for which reading is evaluated by the host computer.

4. The media processing device described in claim 1, wherein:
the reading control unit reads image data and magnetic ink character data from the media; and
the discharge process unit executes a discharge process based on the image data and magnetic ink character data according to configuration instructions sent from the host computer that set the discharge path, set whether to repeat the continuous reading process, and set whether to apply an electronic processing mark indicating that the image data and magnetic ink character data were electronically processed.

5. A media processing system comprising:
a host computer; and
a media processing device for continuously reading a plurality of media based on a command from the host computer, and including
a transportation path through which media are conveyed,
a reading control unit that reads information from the media in the transportation path to extract a plurality of evaluation items, and
a discharge process unit that executes a discharge process based on a read result;
wherein the reading control unit executes a read process for all evaluation items when a reading accuracy priority mode that prioritizes reading accuracy is set, and executes a read process only for specific evaluation items of the all evaluation items when a reading speed priority mode that prioritizes reading speed is set; and
the discharge process unit runs the discharge process based on the read result for all evaluation items in the reading accuracy priority mode, and runs the discharge process based on the read result for the selected specific evaluation items in the reading speed priority mode.

6. The hybrid processing system described in claim 5, wherein:
the reading accuracy priority mode includes
a sequential processing mode in which conveying the next media starts after the previously conveyed media is discharged, and
a parallel processing mode in which conveying the next media starts before the previously conveyed media is discharged.

7. The media processing system described in claim 5, wherein:
the specific evaluation items are items that the media processing device can read and evaluate alone, and
the group of all evaluation items includes items for which reading is evaluated by the host computer.

8. The media processing system described in claim 5, wherein:
the reading control unit reads image data and magnetic ink character data from the processed media; and
the discharge process unit executes a discharge process based on the image data and magnetic ink character data according to configuration instructions sent from the host computer that set the discharge path, set whether to repeat the continuous reading process, and set whether to apply an electronic processing mark indicating that the image data and magnetic ink character data were electronically processed.

9. A media processing device comprising:
a transportation path through which media are conveyed;
a reading control unit that reads information from the media in the transportation path to extract a plurality of evaluation items; and
a discharge process unit that executes a discharge process based on a read result;
wherein the reading control unit executes a read process for specific evaluation items when a reading speed priority mode that prioritizes reading speed is set, and executes a read process for more evaluation items than in the reading speed priority mode when a reading accuracy priority mode that prioritizes reading accuracy is set; and
the discharge process unit runs the discharge process based on the read result for the items processed in the reading accuracy priority mode or the reading speed priority mode.

10. The media processing device described in claim 9, wherein:
the reading control unit executes a read process for all evaluation items when a reading accuracy priority mode that prioritizes reading accuracy is set, and executes a read process for specific evaluation items when a reading speed priority mode that prioritizes reading speed is set.

11. The media processing device described in claim 9, wherein:
when in the reading accuracy priority mode and the sequential processing mode is set, conveying the next media starts after the previously conveyed media is discharged, and
when the parallel processing mode is set, conveying the next media starts before the previously conveyed media is discharged.

12. The media processing device described in claim 9, wherein:
 image data and magnetic ink character data are read from the media, and the read information is sent to the host computer;
 the read result is evaluated based on the read information; and
 the discharge path is set, whether to repeat the continuous reading process is set, and whether to apply an electronic processing mark indicating that the image data and magnetic ink character data were electronically processed is set according to the read result.

* * * * *